United States Patent [19]
Edwards

[11] 3,853,907
[45] Dec. 10, 1974

[54] ANTIBACTERIAL BIS(IMIDAZOLIUM QUATERNARY SALTS)

[75] Inventor: Philip Neil Edwards, Macclesfield, England

[73] Assignee: Imperial Chemical Industries Limited, London, England

[22] Filed: Sept. 28, 1972

[21] Appl. No.: 293,058

[30] Foreign Application Priority Data
Oct. 14, 1971  Great Britain .................... 47796/71

[52] U.S. Cl. ............... 260/309, 260/309.2, 424/273
[51] Int. Cl. ...................... C07d 49/36, C07d 49/38
[58] Field of Search .......................... 260/309, 309.2

[56] References Cited
OTHER PUBLICATIONS

Consortium fuer Elecktrochemische Industrie, Chem. Abst., Vol. 72, No. 121529z, (1970), QD1.A51.
Feitelson et al., Chem. Abst., Vol. 47, columns 1132–1133, (1953), QD1.A51.
Libman et al., J. Chem. Soc., (London), 1952, pages 2305–2307, QD1.C6.
Lions et al., Chem. Abst., Vol. 53, columns 5260–5261, (1959), QD1.A51.
Pozharskii et al., Chem. Abst., Vol. 68, No. 105096t, (1968), QD1.A51.
Schütze et al., J. prakt. Chem., [4] vol. 8, pages 306–3113, (1959), TP1.J89.
Simonov et al., Chem. Abst., Vol. 57, columns 8559–8560, (1962), QD1.A51.
Toho Rayon Co., Chem. Abst., Vol. 63, column 8371, (1965), QD1.A51.

*Primary Examiner*—Natalie Trousof
*Attorney, Agent, or Firm*—Cushman, Darby & Cushman

[57] ABSTRACT

The disclosure relates to bis(imidazolium quaternary salts), a process for their manufacture, compositions containing them, and a method of preventing the growth of, or killing, bacteria by applying one of the novel imidazolium salts to a bacterially-infected environment.

7 Claims, No Drawings

ANTIBACTERIAL BIS(IMIDAZOLIUM QUATERNARY SALTS)

This invention relates to novel imidazole derivatives which possess valuable antibacterial properties.

According to the invention there is provided an imidazole derivative of the formula:

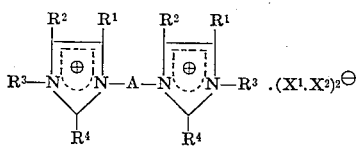

I wherein $R^1$ and $R^2$ are hydrogen atoms, or $R^1$ and $R^2$ together form a fused benzene ring; $R^3$ is an alkyl radical of 6 to 14 carbon atoms, a benzyl radical bearing 0 to 5 chlorine substituents in the benzene ring thereof, or a 3-alkoxy-2-hydroxypropyl radical wherein the alkoxy part is of 4 to 8 carbon atoms; $R^4$ is a hydrogen atom, or an amino radical, or an alkyl radical of 1 to 3 carbon atoms; $(X^1.X^2)^2$ represents two mono-anions or a di-anion; and A is a linking group selected from:

1. $-(CH_2)_n-$
2. $-CH_2.CH(OH).CH_2-$
3. $-(CH_2)_2.(OCH_2CH_2)_p.O(CH_2)_2-$
4. $-(CH_2)_m.CO.NH(CH_2)_n.NH.CO(CH_2)_m-$
5. $-CH_2CO.NH(CH_2)_5O(CH_2)_5NH.COCH_2-$ or
6. $-(CH_2)_r.Z.(CH_2)_r-$ wherein $n$ is 2 to 12, $m$ is 1 or 2, $p$ is 0 to 2, $r$ is 1 to 4, and Z is a phenylene, naphthylene or phenylenedioxy radical, or an alkylenedioxy radical of 2 to 12 carbon atoms.

When $R^3$ is an alkyl radical it is preferably a straight chain alkyl radical, for example an n-octyl, n-decyl or n-dodecyl radical.

When $R^3$ is an optionally substituted benzyl radical, it is preferably a 4-chloro- or 2,4-dichloro-benzyl radical.

When $R^3$ is a 3-alkoxy-2-hydroxypropyl radical, the alkoxy part is preferably a straight chain alkoxy radical of from 4 to 8 carbon atoms, for example an n-heptyloxy radical.

When $R^4$ is an alkyl radical, it is preferably a methyl radical.

When $(X^1.X^2)^2$ represents two mono-anions, suitable anions are, for example, halide ions, for example chloride or bromide anions, or anions derived from a sulphonic acid, for example the methanesulphonate or toluene-$p$-sulphonate anions, or anions derived from a carboxylic acid, for example the benzoate anion; and when $(X^1.X^2)^2$ represents a dianion, a suitable dianion is, for example, the sulphate or hydrogen phosphate anion.

When A is a linking group of the formula 1, a particularly suitable value of $n$ is 2, 4, 6, 8, 10 or 12.

When A is a linking group of the formula 3, a particularly suitable value of $p$ is 0.

When A is a linking group of the formula 4, a particularly suitable value for $m$ is 1 and for $n$ is 4, 6, 8, 10 or 12.

When A is a linking group of the formula 6, a particularly suitable value for $r$ is 1, 2 or 3, and a particularly suitable name for Z is a phenylene, phenylenedioxy or naphthylene radical, each optionally substituted by chlorine atoms or methoxy or methyl radicals, for example an o- or p-phenylene, a 2,5-dimethyl-1,4-phenylene, a 2,5-dimethoxy-1,4-phenylene, a 2,4,5,6-tetrachloro-1,3-phenylene, a 1,5-naphthylene or a 1,4-phenylenedioxy radical, or Z is a straight chain alkylenedioxy radical of 2 to 12 carbon atoms, for example a hexylenedioxy radical.

A particular group of compounds of the invention are those of the formula I wherein $R^1$ and $R^2$ are hydrogen atoms or $R^1$ and $R^2$ together form a fused benzene ring; $R^3$ is a straight chain alkyl radical of from 8 to 10 carbon atoms, a 4-chlorobenzyl radical or a 2,4-dichlorobenzyl radical; $R^4$ is hydrogen or a methyl radical; $(X^1.X^2)^2$ represents two chloride, bromide or methanesulphonate anions; and A is a linking group selected from linking groups of the formula 1–6.

A particular sub-group within the above group comprises those compounds where $R^1$, $R^2$, $R^3$ and $(X^1.X^2)^2$ are as above and A is an o-, m- or p-phenylene radical, each optionally substituted by one or more chlorine atoms or methoxy or methyl radicals.

A further particular sub-group within the above group comprises those compounds where $R^1$, $R^2$, $R^3$ and $(X^1.X^2)^2$ are as above and A is a linking group of the formula 4 in which $m$ is 1 and $n$ is an even number between 4 and 12.

Yet a further particular sub-group within the above group comprises those compounds where $R^1$, $R^2$, $R^3$ and $(X^1.X^2)^2$ are as above and A is a linking group of the formula 1 in which $n$ is an even number between 4 and 12.

Particular imidazole derivatives of the invention are described in Examples 1 to 5 and of these, specially preferred derivatives are those in which $(X^1.X^2)^2$ is selected from two chloride and two bromide ions and the diimidazolium cation is 1,1'-(1,2-xylylene)di(3-n-decylimidazolium bromide) (for example compound 12), 1,1'-octamethylenebis(carbamoylmethyl)di(3-n-decylimidazolium chloride) (for example compound 21), 1,1'-decamethylenebis(carbamoylmethyl)di(3-n-octylimidazolium chloride) (for example compound 22) and 1,1'-decamethylenebis(3-n-decyl-2-methylimidazolium bromide) (for example compound 47).

According to a further feature of the invention there is provided a process for the manufacture of the imidazole derivative of the invention, A, $R^1$, $R^2$, $R^3$ and $R^4$ having the meanings stated above, which comprises:- a. the quarternization of an imidazole derivative of the formula:-

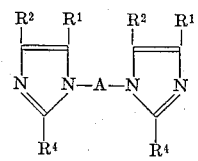

II with a quaternizing agent or agents of the forumla $R^3Y^1$, $R^3Y^2$ or $R_2^3(Y^1.Y^2)$ wherein $Y^1$ and $Y^2$, which may be the same or different, are monovalent radicals and $Y^1$ and $Y^2$, which may be the same or different, are monovalent radicals and $Y^1.Y^2$ is a divalent radical derived from acids $HY^1$, $HY^2$ and $H_2Y^1Y^2$ respectively having $pk$ values of less than 2, for example $Y^1$ and $Y^2$ may be halide atoms or methanesulphonate or toluenep-sulphonate radicals and $Y^1.Y^2$ may be a sulphate radical;

b. for the preparation of those compounds in which $X^1$ and $X^2$ are monovalent anions, the quaternization of an imidazole derivative of the formula:-

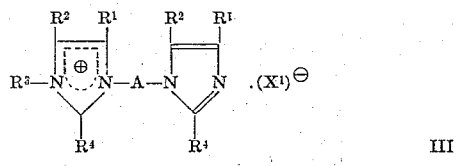

III with a quaternizing agent for the formula $R^3Y^1$ wherein $Y^1$ is as above;

c. for the preparation of those compounds in which $X^1$ and $X^2$ are monovalent anions, the quaternization of an imidazole derivative of the formula:

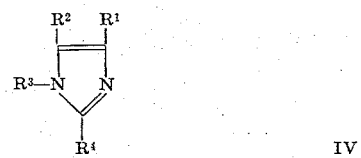

IV with a quaternizing agent of the formula $Y^1$-A-$Y^2$ wherein $Y^1$ and $Y^2$, which may be the same or different, have the meanings stated above;

d. for the preparation of those compounds in which $X^1$ and $X^2$ are monovalent anions, the quaternisation of an imidazole derivative of the formula IV with a quaternizing agent of the formula:

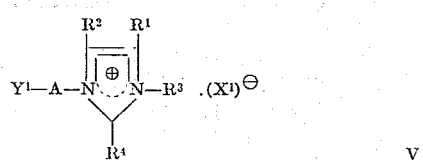

V wherein $Y^1$ has the meaning stated above; or e. in order to convert one imidazole derivative of the invention into another, the reaction of a derivative of the formula:-

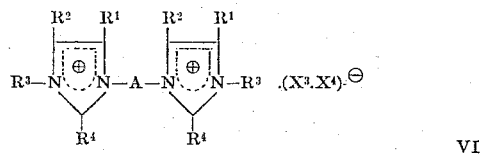

VI with a salt of the formula $D^+.(X^5)^-$, $D^+.(X^6)^-$ or $D^+B^+.(X^5.X^6)^{2\ominus}$, wherein $(X^3.X^4)^{2\ominus}$ and $(X^5.X^6)^{2\ominus}$ represent different groups of two monovalent anions or a divalent anion falling within the above definition of $(X^1.X^2)^{2\ominus}$, in a metathetical reaction; the salt of the formula $D^+.(X^5)^-$, $D^+.(X^6)^-$ or $D^+B^+.(X^5.X^6)^{2\ominus}$ may be a soluble salt, for example a water soluble salt, or it may be an insoluble salt, for example an ion exchange resin.

The reactions (a), (b), (c) and (d) are preferably carried out by heating the reactants together with or without an additional diluent or solvent.

The compounds of the invention possess valuable antibacterial properties in that they kill a wide range of both Gram-positive and Gram-negative bacteria as demonstrated by serial dilution assay. They are therefore useful as general environmental antiseptics and disinfectants, as pre-operative skin antiseptics, and they are also useful in dental hygiene, for example for inhibiting the formation of dental plaque or in the treatment or prevention of gingivitis.

Thus, according to a further feature of the invention, there is provided a composition comprising an imidazole derivative of the invention together with an inert diluent or carrier.

The composition of the invention may be a pharmaceutical composition, for example in the form of a lozenge suitable for oral administration, a sterile mouthwash, paste, gel or fluid suspension suitable for use in dental hygiene for the inhibition of dental plaque formation and in the treatment of gingivitis, or an ointment, cream, or a sterile aqueous or oily solution or suspension for topical use; or it may be a non-pharmaceutical composition, for example an aqueous or oily solution or suspension, or an aerosol, for use as a general, environmental antiseptic or disinfectant.

The composition may contain conventional excipients and carriers, and may be manufactured by the application of conventional techniques.

Preferred pharmaceutical compositions of the invention are 1g. lozenges, each containing from 1 to 10mg. of a compound of the invention; powder or tablets for dissolution in water to give an aqueous solution suitable for use as an antiseptic; mouthwashes containing between 0.05 and 0.5 percent (at user dilution) of a compound of the invention; toothpastes and dental gels containing between 0.05 and 1.0 percent, preferably between 0.1 and 0.5 percent of a compound of the invention; and an aqueous solution suitable for use as an antiseptic and containing from 0.02 to 1.0% of a compound of the invention. A preferred non-pharmaceutical composition is an aqueous solution in the form of a concentrate containing from 1 percent to that percentage which gives saturated solution of a compound of the invention.

The invention is illustrated but not limited by the following Examples:

EXAMPLE 1

A mixture of 1-n-decylimidazole (2.08g.) and ethylene dibromide (0.94g.) was heated on a steam-bath. A vigorous reaction was initiated during which the internal reaction temperature rose to about 160°C. The mixture was heated on the steam-bath for 10 minutes to ensure complete reaction of the 1-(2-bromoethyl)-3-n-decylimidazolium bromide formed in situ, and then cooled, and the residue was triturated with ether to give a white, crystalline solid. Crystallisation of this solid from acetonitrile gave 1,1'-ethylenebis(3-n-decylimidazolium)-dibromide, m.p.250°–253°C. (with decomposition). (Compound 1).

The above process is repeated, replacing the ethylene dibromide by an equivalent quantity of the appropriate dihalide and 1-decylimidazole by an equivalent quantity of the appropriate 1-substituted imidazole to give the following compounds:

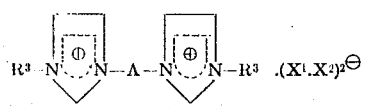

| Number | A | R³ | X¹=X² | Crystallisation solvent | M.P. (° C.) |
|---|---|---|---|---|---|
| 2 | —(CH₂)₄— | n-Decyl | Br | Acetone/ethyl acetate | 63–65 |
| 3 | —(CH₂)₅— | do | Br |  | 91–92 |
| 4 | —(CH₂)₆— | do | Br | Acetone/ethyl acetate | 55–58 |
| 5 | —(CH₂)₆— | 4-chlorobenzyl | Br |  | 125–128 |
| 6 | —(CH₂)₆— | 2,4-dichlorobenzyl | Br | Acetone/acetonitrile | 145–146 |
| 7 | —(CH₂)₁₀— | n-Decyl | Br | Water | 66–68 |
| 8 | —(CH₂)₁₀— | 2,4-dichlorobenzyl | Br | do | 225–226.5 |
| 9 | —CH₂—C₆H₄—CH₂— | n-Decyl | Cl | Acetonitrile | 116–118 |
| 10 | Same as above | 4-chlorobenzyl | Cl | Acetonitrile/ethyl acetate | 245–248 |
| 11 | do | 2,4-dichlorobenzyl | Cl | Ethanol/ether | 247–248 |
| 12 | —CH₂—C₆H₄—CH₂— (ortho) | n-Decyl | Br | Acetonitrile | 198–200 |
| 13 | —CH₂—(2,5-dimethylphenyl)—CH₂— | do | Cl | do | 223.5–225.5 |
| 14 | —CH₂—(2,5-dimethoxyphenyl)—CH₂— | do | Cl | do | 100–102 |
| 15 | —CH₂—(2,4,5-trichlorophenyl)—CH₂— | do | Cl | do | 203–205 |
| 16 | —CH₂—(naphthyl) | do | Cl | Water | >230(d) |
| 17 | —(CH₂)₂O—C₆H₄—O(CH₂)₂— | do | Cl | Acetonitrile/ethyl acetate | 140–145 |
| 18 | —CH₂CO·NH(CH₂)₄NH·COCH₂— | do | Cl | Acetone/water | 129–132 |
| 19 | —CH₂CO·NH(CH₂)₆NH·COCH₂— | n-Octyl | Cl | Acetone/acetonitrile | 112–114 |
| 20 | —CH₂CO·NH(CH₂)₆NH·COCH₂— | n-Decyl | Cl | Acetone/water | 115–118 |
| 21 | —CH₂CO·NH(CH₂)₈NH·COCH₂— | do | Cl | Acetone/acetonitrile | 101–104 |
| 22 | —CH₂CO·NH(CH₂)₁₀NH·COCH₂— | n-Octyl | Cl | Acetone/water | 98.5–100 |
| 23 | —CH₂CO·NH(CH₂)₁₀NH·COCH₂— | n-Decyl | Cl | do | 83–85.5 |
| 24 | —CH₂CO·NH(CH₂)₁₀NH·COCH₂— | n-C₇H₁₅O·CH₂·CH(OH)CH₂— | Cl | Acetone/acetonitrile | 112–113 |
| 25 | —CH₂CO·NH(CH₂)₁₂NH·COCH₂— | n-Octyl | Cl | Acetonitrile | 138–140 |
| 26 | —CH₂CO·NH(CH₂)₁₂NH·COCH₂— | n-Decyl | Cl | do | 144–146 |

The 1-p-chlorobenzylimidazole used as starting material in the above process may be prepared as follows.

Sodium hydride (1.584g. of a 50 percent dispersion in oil) was washed free of oil with petroleum either (b.p.60°–80°C.), then stirred under nitrogen in dimethylformamide (10ml.) during the dropwise addition of a solution of imidazole (3.54g.) in dimethylformamide (10ml.). After the addition and when evolution of hydrogen had ceased, p-chlorobenzyl bromide was added dropwise, and the temperature allowed to rise to 60°C. After addition of the bromide, the mixture was left overnight, filtered, the solvent was evaporated and the residual yellow oil was distilled to yield 1-p-chlorobenzylimidazole as a colourless oil, b.p.142°–146°C. at 0.01 torr.

In a similar manner but using n-decyl bromide, 3-n-heptyloxy-2-hydroxypropyl chloride or 2,4-dichlorobenzyl bromide in place of p-chlorobenzyl bromide, there was obtained 1-n-decylimidazole, b.p.117°–120°C. at 0.01 torr, 1-(3-n-heptyloxy-2-hydroxypropyl)imidazole, b.p.170°14 180°C. at 0.05 torr and 1-(2,4-dichlorobenzyl)imidazole, m.p.53°–56°C. [after recrystallisation from petroleum ether (b.p.60°–80°C.)], respectively.

The 3-n-heptyloxy-2-hydroxypropyl chloride, b.p.80°–82°C. at 0.02 torr, may be obtained by the reaction of epichlorhydrin and n-heptyl alcohol following the method described in J. Org. Chem., 1943, 8, 189.

The N,N'-decamethylenebis(α-chloracetamide) used as starting material may be obtained as follows.

1,10-Diamino-n-decane (8.6g.) was dissolved in the minimum quantity of cold methanol and methyl chloroacetate (10.8g.) was added. The mixture was stirred for 18 hours, excess water added and the white precipitate recrystallised from isopropanol to give N,N'-decamethylenebis(α-chloracetamide), m.p.123°–123.5°C.

In a similar manner, but using 1,12-diamino-n-dodecane in place of 1,10-diamino-n-decane, there was obtained N,N'-dodecamethylenebis(α-chloracetamide), m.p.122°–124°C. from isopropanol.

EXAMPLE 2

The process described in Example 1 was repeated using an appropriate dihalide in place of ethylene dibromide, and an appropriate 1-substituted benzimidazole or 1-substituted-2-aminobenzimidazole in place of 1-n-decylimidazole, to give the following compounds:-

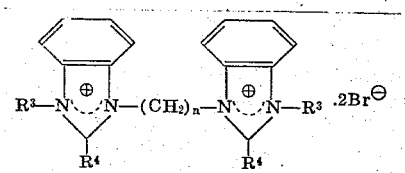

mide. There were thus obtained:
1-n-decylbenzimidazole, b.p.158°–160°C. at 0.01 torr. 1-n-octylbenzimidazole, b.p.148°–160°C. at 0.02 torr.

The 2-amino-1-n-decylbenzimidazole, m.p.59°–61°C., used as starting material may be obtained by the process described in the last part of Example 1 for the preparation of 1-(2,4-dichlorobenzyl)imidazole, replacing imidazole by 2-aminobenzimidazole, and 2,4-dichlorobenzyl bromide by n-decyl bromide.

EXAMPLE 3

The process described in Example 1 was repeated using an appropriate dihalide in place of ethylene dibromide and an appropriate substituted imidazole in place of 1-n-decylimidazole, to give the following compounds:

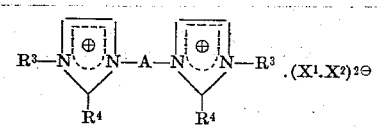

| No. | A | $R^3$ | $R^4$ | $X=X^2$ | Crystallisation solvent | M.P. (°C.) |
|---|---|---|---|---|---|---|
| 33 | —(CH$_2$)$_{10}$— | n-Octyl | H | Br | Acetone | 90–93 |
| 34 | —(CH$_2$)$_{10}$— | n-C$_7$H$_{15}$OCH$_2$—CH(OH)CH$_2$— | H | Cl | | 90.5–92 |
| 35 | —(CH$_2$)$_{12}$— | n-Decyl | H | Br | Water | 65–68 |
| 36 | —CH$_2$CH(OH)CH$_2$— | n-Octyl | H | Br | Acetone/acetonitrile | 152–154 |
| 37 | —CH$_2$CH(OH)CH$_2$— | n-Decyl | H | Br | do | 158–160 |
| 38 | —CH$_2$CH(OH)CH$_2$— | n-Dodecyl | H | Br | do | 154–157 |
| 39 | —(CH$_2$)$_2$O(CH$_2$)$_2$— | n-decyl | H | Cl | Acetone | 63–65 |
| 40 | —CH$_2$CO · NH(CH$_2$)$_8$NH · COCH$_2$— | n-Octyl | H | Cl | Acetone/acetonitrile | 97–101 |
| 41 | —CH$_2$CO · NH(CH$_2$)$_{10}$NH · COCH$_2$— | 2,4-dichlorobenzyl | H | Cl | Acetone/water | *252.5–253.5 |
| 42 | —CH$_2$CO · NH(CH$_2$)$_{12}$NH · COCH$_2$— | do | H | Cl | do | 237–238.5 |
| 43 | —CH$_2$CO · NH(CH$_2$)$_6$O(CH$_2$)$_5$NH · COCH$_2$— | n-Decyl | H | Cl | | 58–61 |
| 44 | —CH$_2$CONH(CH$_2$)$_3$O(CH$_2$)$_6$O(CH$_2$)$_3$NHCOCH$_2$— | n-Octyl | H | Cl | Acetone | 85.5–87 |
| 45 | —CH$_2$ CH$_2$— (with phenyl) | n-Decyl | H | Cl | Acetonitrile | 201–205 |
| 46 | —(CH$_2$)$_2$ | do | CH$_3$ | Br | do | 296–298 |
| 47 | —(CH$_2$)$_{10}$— | do | CH$_3$ | Br | Acetone | 77–79 |
| 48 | —CH$_2$CO · NH(CH$_2$)$_8$NH · COCH$_2$— | do | CH$_3$ | Cl | do | 104–106 |
| 49 | —CH$_2$ CH$_2$— (with phenyl) | do | CH$_3$ | Br | Acetonitrile | 210–213 |

*Acetone solvate.

| n | $R^4$ | $R^3$ | Crystallisation solvent | M.p. (°C.) |
|---|---|---|---|---|
| 4 | H | n-octyl | acetonitrile | 115–118 |
| 4 | H | n-decyl | acetonitrile | 117–121 |
| 6 | H | n-octyl | acetone | 160–161.5 |
| 6 | H | n-decyl | acetone | 179–181 |
| 4 | NH$_2$ | n-decyl | — | 314–315 |
| 6 | NH$_2$ | n-decyl | acetonitrile/water | 265–268 |

The 1-alkylbenzimidazoles used as starting material may be obtained by a similar process to that described in the second part of Example 1 for the preparation of 1-p-chloro-benzylimidazole, but starting from the appropriate benzimidazole and the appropriate alkyl bromide.

The N,N'-(4,11-dioxatetradecamethylene)bis(α-chloracetamide) and N,N'-(6-oxaundecamethylene)-bis(α-chloracetamide) used as starting materials may be prepared by repeating the last part of Example 1 using 1,14-diamino-4,11-dioxa-n-tetradecane and 1,11-diamino-6-oxa-n-undecane respectively in place of 1,10-diamino-n-decane. The products have m.p's 91.5–92.5 on recrystallisation from petroleum ether (b.p.60°–80°C.)/ethyl acetate and 116°–120 C. respectively.

EXAMPLE 4 n-Decyl methanesulphonate (10.3g.) and 1,1'-octamethylenebis (carbamoylmethyl)di-imidazole (7.2g.) were heated together at 130°C., the internal temperature rising to 165°C. After 15 minutes the mixture was cooled, and the gum was dissolved in boiling acetone. The solution was left for 48 hours and the resulting white solid was filtered and washed with acetone and ether to give 1,1'-octamethylenebis(carbamoylmethyl) di(3-$n$-decylimidazolium methanesulphonate), m.p.84°–87°C. (Compound 50).

The above process was repeated using 1,1'-(1,2-xylylene) di-imidazole and $n$-decyl bromide in place of 1,1'-octamethylenebis (carbamoylmethyl)di-imidazole and $n$-decyl methanesulphonate respectively to give 1,-1'-(1,2-xylylene)-di(3-$n$-decylimidazolium bromide), m.p.198°–200°C. on recrystallisation from acetonitrile. (Compound 12).

The 1,1'-octamethylenebis(carbamoylmethyl)di-imidazole and 1,1'-(1,2-xylylene)di-imidazole used as starting materials in the above process may be prepared by repeating the second part of Example 1 using ½ molecular equivalent of N,N¹-octamethylenebis($\alpha$-chloracetamide) and 1,2-bischloromethylbenzene respectively in place of 1 molecular equivalent of $p$-chlorobenzyl chloride. The products have m.p's 128°–129°C. on recrystallisation from acetonitrile, and 91.5°–92.5°C. on recrystallization from petroleum ether (b.p.60°–80°C.)/ethyl acetate, respectively.

EXAMPLE 5

A solution of sodium benzoate (0.58g.) in water (5ml.) was added to a solution of 1,1'-(1,2-xylylene)-di(3-n-decylimidazolium chloride) (1.18g.) in water (20ml.), and the resulting suspension was stirred for 30 minutes. The solid was filtered and recrystallised from acetone to give 1,1'-(1,2-xylylene)di(3-$n$-decylimidazolium benzoate), m.p.105°–115°C. (Compound 51).

EXAMPLE 6

Compositions containing imidazole derivatives of the invention may be prepared from any imidazole derivative of the invention described in the foregoing Examples by conventional procedures as illustrated below, where, it is to be understood, the particular imidazole derivative named may be replaced by an equipotent amount of any other imidazole derivative of the invention.

LOZENGE

A mixture of sucrose (92.5g.), magnesium stearate (1g.), gum acacia (3g.), water (3ml.) and 1,1-octamethylenebis-(carbamoylmethyl)di(3-$n$-decylimidazolium chloride) (0.5g.) is blended and compressed into hard lozenges such that each weighs 1g., and contains 5mg. of the antibacterial pyridine derivative.

ANTISEPTIC 1,1'-Decamethylenebis(carbamoylmethyl)di(3-$n$-octylimidazolium chloride) (0.5g.) is dissolved in sterile distilled water (99.5ml.) to give a liquid composition suitable for use as an antiseptic.

TOOTHPASTE

A solution is prepared by stirring saccharin sodium (0.2g.) in purified water (38.8ml.) to which is then added isopropanol (4.0g.) and glycerin (20g.) (Solution I.)

A mixture of oil of peppermint (0.6g.) and oil of spearmint (0.3g.) is added to Pluronic P75 (0.6g. - Pluronic is a trade mark) followed by 1,1'-decamethylenedi(3-$n$-decyl-2-methylimidazolium bromide) (0.5g.) and stirring is contiuned until a homogeneous solution is formed (Solution II).

Solution I is slowly added to Solution II, with stirring and natrosol 250HH (1g. - Natrosol is a trade mark) is then added, stirring being continued until hydration is complete. A mixture of dicalcium phosphate (20g.), Neosyl E.T. (10g.,), titanium dioxide (1g.) and dried aluminium hydroxide gel (1g.) is then added and mixing is continued until a smooth and uniform paste is formed.

What we claim is:

1. An imidazole derivative selected from the group consisting of compounds of the formula:

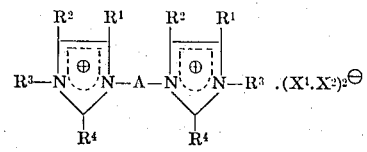

I wherein $R^1$ and $R^2$ are hydrogen; $R^3$ is alkyl of 6 to 14 carbons, benzyl bearing 0 to 5 chlorines in the benzene ring thereof or 3-alkoxy-2-hydroxypropyl wherein the alkoxy part is of 4 to 8 carbons; $R^4$ is hydrogen or alkyl of 1 to 3 carbons; $(X^1.X^2)^{2\ominus}$ represents two chloride, bromide, methanesulphonate, toluene-$p$-sulphonate or benzoate anions or a sulphate or hydrogen phosphate anion; and A is a linking group selected from 1. —(CH$_2$)$_n$—
2. —CH$_2$.CH(OH).CH$_2$—
3. —(CH$_2$)$_2$.(OCH$_2$CH$_2$)$p$.O(CH$_2$)$_2$—
4. —(CH$_2$)$_m$.CO.NH(CH$_2$)$_n$NH.CO(CH$_2$)$_m$—
5. —CH$_2$CO.NH(CH$_2$)$_5$O(CH$_2$)$_5$NH.COCH$_2$—
6. —(CH$_2$)$_r$.Z.(CH$_2$)$_r$— wherein $n$ is 2 to 12, $m$ is 1 or 2, $p$ is 0 to 2, $r$ is 1 to 4 and Z is unsubstituted phenylene, naphthylene or phenylenedioxy, or one of these substituted by chlorine, methoxy or methyl or alkylenedioxy of 2 to 12 carbons; and compounds of the formula:

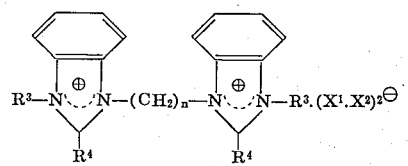

wherein $R^3$ is alkyl of 6 to 14 carbons; $R^4$ is hydrogen or alkyl of 1 to 3 carbons; $(X^1.X^2)^{2\ominus}$ represents two chloride, bromide, methanesulphonate, toluene-$p$ -sulphonate or benzoate anions or a sulphate or hydrogen phosphate anion; and $n$ is 2 to 12.

2. An imidazole derivative according to claim 1 wherein $R^3$ is an $n$-octyl, $n$-decyl, $n$-dodecyl, 4-chlorobenzyl, 2,4-dichloro-benzyl or 3-$n$-heptylozy-2-hydroxypropyl; $R^4$ is hydrogen or methyl; and A is a linking group selected from groups of the formula 1 to 6 in claim 1 in which in formula 1, $n$ is 2, 4, 6, 8, 10 or 12, in formula 3, $q$ is o, in formula 4, $m$ is 1 and $n$ is 4, 6, 8, 10 or 12, and in formula 6, $r$ is 1, 2 or 3 and Z is o- or p-phenylene, 2,5-dimethyl-1,4-phenylene, 2,5-dimethoxy-1,4-phenylene, 2,4,5,6-tetrachloro-1,3- phenylene, 1,5-naphthylene, 1,4-phenylenedioxy or n-hexylenedioxy.

3. The compound 1,1'-(1,2-xylylene)di(3-n-decylimidazolium chloride).

4. The compound 1,1'-octamethylenebis(carbamoylmethyl)di-(3-n-decylimidazolium chloride).

5. The compound 1,1'-decamethylenebis(carbamoylmethyl)di-(3-n-octylimidazolium chloride).

6. The compound 1,1'-decamethylenebis(3-n-decyl-2-methylimidazolium bromide).

7. The compound 1,1'-[4,11-dioxotetradecamethylene-bis(carbamoylmethyl)]di(3-n-octylimidazolium chloride).

* * * * *